United States Patent [19]

Kang et al.

[11] Patent Number: 4,804,275
[45] Date of Patent: Feb. 14, 1989

[54] INDICATOR DEVICE FOR INDICATING THE TIME INTEGRAL OF A MONITORED PARAMETER

[75] Inventors: Karam S. Kang, London; Stephen Munn, Oxfordshire; Judith Robinson, Basingstoke; Eamonn F. Maher, Henley-on-Thames, all of England

[73] Assignee: Johnson Matthey Public Limited Company, London, England

[21] Appl. No.: 901,645

[22] Filed: Aug. 29, 1986

[30] Foreign Application Priority Data

Aug. 29, 1985 [GB] United Kingdom ............... 8521488

[51] Int. Cl.$^4$ .................... G01K 11/12; G02F 1/23
[52] U.S. Cl. .................... 374/162; 340/786; 346/33 TP; 350/355; 368/714
[58] Field of Search ............ 374/106, 102, 162, 103; 426/88; 346/157; 350/353, 355; 368/114; 340/786

[56] References Cited

U.S. PATENT DOCUMENTS

| | | | |
|---|---|---|---|
| 3,090,915 | 5/1963 | Soussloff et al. | 368/114 |
| 3,380,072 | 4/1968 | Groothius | 368/114 X |
| 3,521,941 | 7/1970 | Deb et al. | 340/785 X |
| 3,578,843 | 5/1971 | Castellion | 350/357 |
| 3,602,813 | 8/1971 | Benseman | 374/102 X |
| 3,665,308 | 5/1972 | Beusman | 368/114 X |
| 3,940,205 | 2/1976 | Crandall et al. | 350/357 |
| 4,001,688 | 1/1977 | Marwell et al. | 368/114 |
| 4,009,935 | 3/1977 | Faughnan et al. | 350/357 |
| 4,021,100 | 5/1977 | Giglia | 350/357 X |
| 4,488,780 | 12/1984 | Nicholson | 350/357 X |
| 4,505,538 | 3/1985 | Toussaint et al. | 350/357 |

FOREIGN PATENT DOCUMENTS

0903967 8/1962 United Kingdom ............... 426/88

Primary Examiner—Daniel M. Yasich
Attorney, Agent, or Firm—Cushman, Darby & Cushman

[57] ABSTRACT

A device for indicating the time integral of a monitored parameter comprising a strip of electrochromic material (2), e.g. tungsten trioxide, an electrode (3) at one end of the strip and an electrolyte (4) arranged so that, upon activation, electrons pass from the electrode (3) to the electrochromic material (2) causing the latter to change colour so that a colour change boundary (7) advances along the strip, the rate of advancement being determined by the supply of electrons between the electrode (3) and the colour change boundary (7), which in turn is responsive to changes in the monitored parameter. The device may be used in the form of a self-powered cell needing no power source, as a time temperature indicator suitable for application to perishable commodities.

23 Claims, 4 Drawing Sheets

INDICATOR DEVICE FOR INDICATING THE TIME INTEGRAL OF A MONITORED PARAMETER

BACKGROUND OF THE INVENTION

This invention relates to indicator devices for indicating the time integral of a monitored parameter.

One particular application of the device is for indicating the time temperature integral of degradable or perishable commodities. Such devices may be placed on wrappings or containers of perishable commodities to give a visual indication of the integral of time and temperature to which the commodity has been subjected since packaging, that is, since the fresh condition, in particular for indicating when the commodity has been subject to conditions of time and temperature such that it will have suffered deterioration or spoilage. Such devices are generally known as "time temperature indicators".

In general, the common requirements of a time temperature indicator are that it should exhibit properties which are readily changed by time and/or temperature, give a visual indication of time and temperature integration, and should be activatable when the commodity is fresh or has been recently packaged. Devices which fulfil these requirements are already known and are based on processes such as chemical diffusion, physical diffusion, thermochromic effects, biological reactions, polymer crystallization and electrochemical effects.

Another effect, known as "persistent electrochromism", is known (see U.S. Pat. No. 3,521,941), according to which the electromagnetic radiation absorption properties of a material are altered when subjected to an electric field or injection of charge, thereby causing a colour change in the material. An electrochromic device requiring no externally applied electric power source is disclosed in U.S. Pat. No. 3,940,205, according to which a thin film of tungsten trioxide is deposited on a glass slide and an indium electrode contacts the tungsten trioxide electrochromic layer with an acid electrolyte in contact with the electrochromic layer and the electrode. An internal electrochemical cell is set up so as to produce colouration of the electrochromic material.

SUMMARY OF THE INVENTION

According to a first aspect of this invention there is provided an indicator device for indicating the time integral of a monitored parameter comprising: a substrate carrying a layer of electrochromic material; an electrode; and an electrolyte for contacting both the layer of electrochromic material and the electrode, the device being arranged so that, upon activation, electrons pass from the electrode to the layer of electrochromic material by means of a localized area of communication therebetween causing the electromagnetic absorption characteristic, and hence colour, of the electrochromic material to change so that a colour change boundary advances across the layer of electrochromic material away from the said area of communication, and being arranged so that the rate of advancement of the colour change boundary is substantially determined by the supply of electrons from the electrode to the unchanged electrochromic material at the colour change boundary, the said supply of electrons being responsive to changes in the monitored parameter, whereby the position of the colour change boundary provides a visual indication of the time integral of the monitored parameter since activation of the device.

Thus, the invention is based on the realization that an electrochromic device may be adapted to function as a time integrator of a monitored parameter. One particular form of the invention is an electrochromic device adapted to function as a time-temperature indicator.

According to a second aspect of the invention, there is provided a method of making devices as detailed above comprising the steps of: depositing a layer of electrochromic material in a plurality of areas onto a sheet of substrate; depositing an electrode on or adjacent the layer of electrochromic layer in each of the said areas; providing a quantity of electrolyte in each of the said areas; and sealing the sheet of substrate with electrochromic material, electrode and electrolyte thereon between two polymer sheets; and sealing each of the said areas from each other to define individual devices.

According to a third aspect of the invention, there is provided the use of an electrochromic device as an indicator device for indicating the time integral of a monitored parameter, the device comprising: a substrate carrying a layer of electrochromic material; an electrode; and an electrolyte in contact with the layer of electrochromic material and the electrode, the arrangement being such that a passage of electrons from the electrode to the layer of electrochromic material causes the electromagnetic absorption characteristic, and hence colour, of the electrochromic material to change so that a colour change boundary advances along the layer of electrochromic material to provide a visual indication of the time integral of the monitored parameter since activation of the device.

Other preferred features of the invention will be apparent from the following description and the subsidiary claims of the specification.

BRIEF DESCRIPTION OF THE DRAWINGS

The invention will now be described, merely by way of example, with reference to the accompanying drawings, in which.

DETAILED DESCRIPTION OF THE PREFERRED EMBODIMENTS

Figure 1:
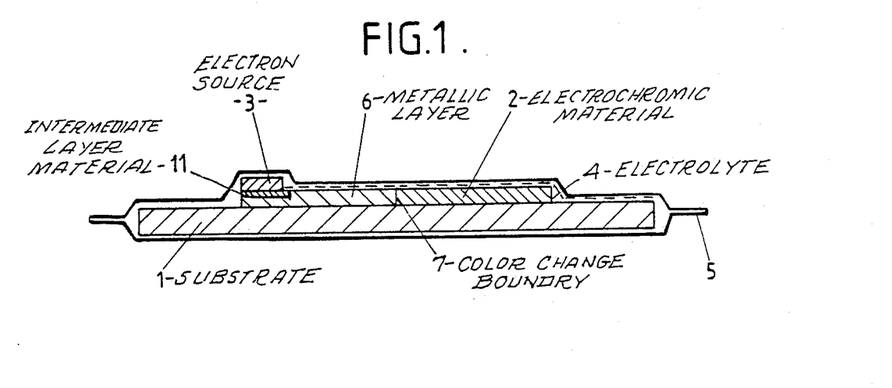
FIG. 1 is a cross-sectional view of one embodiment of a time temperature indicator device according to one form of the invention.
Figure 2:
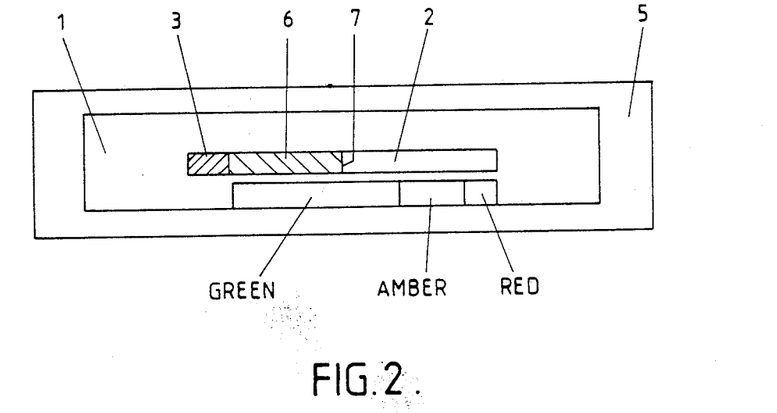
FIG. 2 is a plan view of the device shown in FIG. 1.

FIGS. 1 and 2 show a time temperature indicator device comprising a porous substrate 1, a layer or strip of electrochromic material 2 such as tungsten trioxide ($WO_3$), which is colourless or pale yellow, applied thereto and an electrode 3 in contact with one end of the strip of electrochromic material 2 so that there is a localized area of communication between the electrode 3 and the strip of electrochromic material 2. An electrolyte 4 contacts both the layer of electrochromic material 2 and the electrode 3 and the whole device is encapsulated within a transparent polymer sheath 5.

The electrode 3 is formed of a material such as nickel which dissolves in an acidic electrolyte, as for example electrolyte 4 eg 2M formic acid. As positive ions of the electrode 3 go into solution, the electrons remaining in the electrode 3 are injected into the layer of tungsten trioxide 2. Thus, electrode 3 is an electron source. The resultant negative charge in the layer 2 is then believed to attract hydrogen ions from the electrolyte 4 to react with the electrochromic material under the electrode 3 to convert it (in the case of tungsten trioxide) into hydrogen tungsten bronze ($H_xWO_3$) 6 which absorbs light at the red end of the spectrum and therefore appears blue. The region of the layer of electrochromic material 2 under the electrode 3 therefore becomes coloured. The hydrogen tungsten bronze 6 is a semiconductor whereas the tungsten trioxide is an insulator, so as further electrons are injected into the electrochromic layer 2 they are conducted through the coloured hydrogen tungsten bronze 6 to an interface 7 between the converted (and hence coloured) and unconverted (and hence uncoloured) tungsten trioxide so that the formation of hydrogen tungsten bronze continues. It is believed that hydrogen ions are attracted into the layer of electrochromic material along the whole length of the coloured portion thereof during this process and diffuse down the concentration gradient between the oldest coloured portion thereof and the most recently coloured portion. The interface 7 is clearly shown by a colour change boundary between the coloured and uncoloured material, and as the tungsten trioxide is progressively converted to hydrogen tungsten bronze the interface 7 advances along the strip. The position of the colour change boundary is thus dependent on the time and temperature since activation of the device and so provides a visual indication of the cumulative time-temperature history of the device, since the rate of electron and hydrogen ion transfer is dependent on both time and temperature. The device is effectively acting as a coulomb meter.

In a typical device the strip of electrochromic material may be between 2 mm and 4 mm wide, between 20 mm and 40 mm long and about 10 $\mu$m to 30 $\mu$m thick. The device may be applied very much like a label to the wrapping or container of a product (not shown in the drawings) and may be provided with a calibration scale to indicate the state of the product as a result of its time-temperature history. One convenient way of doing this is to mark the device with green, amber and red areas as shown in FIG. 2 such that when the colour change boundary is within the green area this indicates that the product should be fresh, when in the amber area this indicates that the product should be used in the near future, and when in the red area this indicates that the product may have passed its "sell-by" date and may be unsatisfactory.

The arrangement described above effectively comprises an internal electrochemical cell and so requires no external power source. The cell can be designed to have a high internal resistance so that it discharges slowly and produces a slow moving colour change boundary 7.

The rate at which the colour change boundary 7 advances along the strip is dependent on a number of factors and if the device is to be used as a time temperature indicator it must be designed so that the rate controlling step is temperature sensitive. In general, the rate controlling step either involves the supply of electrons, ie the initial injection of electrons or their subsequent movement to the unconverted tungsten trioxide at the colour change boundary, or the movement of a larger species, eg the diffusion of hydrogen ions from the elecrolyte into the layer of electrochromic material. The supply of electrons can generally be made much more temperature sensitive than the diffusion of a species such as hydrogen ions so if the device is to be used as a time-temperature indicator it should be arranged so that the supply of electrons controls the rate of the colouration process.

Devices in which the colouration rate is controlled by the supply of electrons can also be used in other applications (described further below) in which the supply of electrons is sensitive to other parameters besides temperature. The processes involved in the supply of electrons will now be considered.

The supply of electrons from the electrode to unconverted tungsten trioxide at the colour change boundary is dependent upon a number of processes:

(a) the dissolution of the electrode in the electrolyte whereby an excess of electrons is created in the electrode for injection into the layer of electrochromic material;

(b) the transfer of electrons from the electrode into the layer of electrochromic material—this can be regulated by the use of an intermediate layer of material 11 of a predetermined conductance or of variable conductance between the electrode and the electrochromic material using techniques known to those of ordinary skill. The layer may, for instance, comprise a nickel manganite ($NiMn_2O_4$) thermistor or a cadmium sulphide (CdS) photoconductor.

(c) the transfer of electrons along the strip of converted hydrogen tungsten bronze to the colour change boundary. The coloured electrochromic material is a semi-conductor and changes in its conductance will alter the potential drop along its length which in turn affects the rate at which hydrogen ions are attracted from the electrolyte and also the potential drop across the colour boundary; and (d) the transfer of electrons across the colour change boundary from the converted hydrogen tungsten bronze to the unconverted tungsten trioxide. This is dependent upon the diffusion length of the electrons and the potential drop across the boundary and hence the capacitance thereof.

The device can be arranged so that any of these processes is the rate controlling step but the examples described herein will mostly relate to process (a). In order to make a device in which the rate of dissolution of the electrode is the rate controlling step, it is necessary to consider three criteria:

(i) electrode characteristics (ie electrode material, and the type and the strength of electrolyte) which dictate the rate of dissolution;

(ii) electrochromic layer characteristics (ie. type of material, grain size, resistivity, dielectric constant, etc.) which dictate the rate of diffusion of hydrogen and electrons; and (iii) temperature, since electrode dissolution rates generally increase with temperature.

Figure 3:
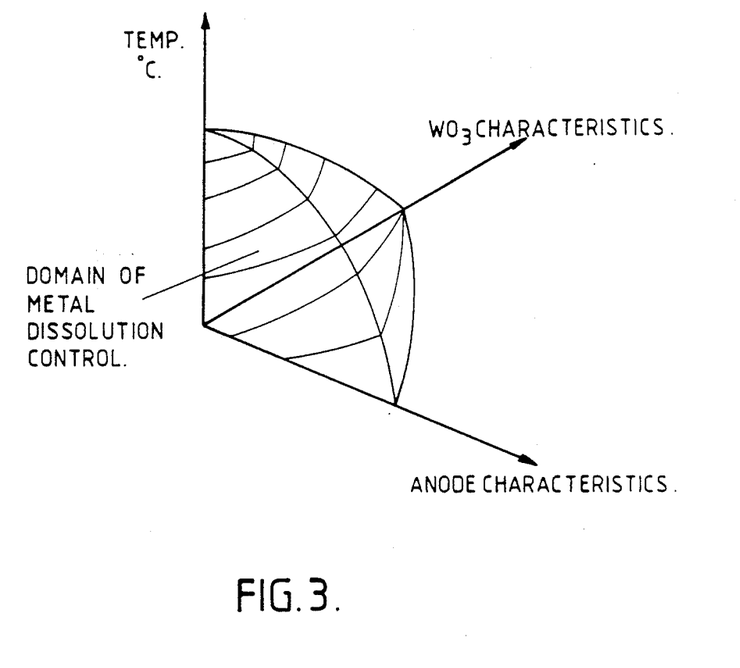
FIG. 3 shows a 3-dimensional model defining a domain within which electrode dissolution controls the rate of advancement of the colour change boundary in a device such as that shown in FIGS. 1 and 2.

A three-dimensional model can therefore be constructed which defines a domain within which electrode dissolution controls the colouration rate and outside which diffusion processes dominate (see FIG. 3).

As will be discussed in more detail below, the rate at which the colour change boundary moves is dependent on several factors. However, devices can be designed to operate in the temperature range −40° C. to 100° C. and which monitor the time-temperature history of a commodity for periods in the range 10 minutes to 10 months. Preferred ranges, for instance for perishable food products, are a temperature range of 0° C. to 40° C. and time periods in the range of a few days to a few weeks. The temperature sensitivity of the devices may be such that the rate of boundary movement increases 1.5 to 4.5 times for a 10° C. temperature rise. Devices for use with food products may, for instance, produce 30 mm of colouration in 2 weeks at 5° C. and 30 mm of colouration in 5.6 days at 15° C. That is a rate of movement between 0.09 and 0.22 mm/hour and an increase in the rate of movement of 2.4 times for a 10° C. temperature rise.

The individual components of the device described above in relation to FIGS. 1 and 2 will now be discussed in more detail to indicate the different materials these components can be made from and the criteria governing their selection.

The substrate 1 is preferably made of a porous material such as paper when a liquid electrolyte 4 is used to facilitate even distribution of the electrolyte in contact with the electrochromic material 2. The electrolyte could alternatively be in the form of a gel which would permit the use of a non-porous substrate. Conveniently, the substrate is flexible to enable the device to be easily attached to packaging and is opaque or semi-opaque to help show up the position of the colour change boundary.

The electrochromic material 2 is preferably tungsten trioxide, although other oxides such as $MoO_3$ and $V_2O_5$ may be used. It is preferably applied as a powder, which may be mixed with an inert filler and dispersed in an organic vehicle, by a thick film technique such as screen printing to produce a layer between 5 $\mu$m to 80 $\mu$m thick, the thicker film giving slower colouration rates. The amount of inert filler, such as glass, which is used affects the conductance of the material. In some circumstances, it may be desirable to include a relatively large proportion of inert filler to reduce the conductance of the material to such an extent that the rate of transfer of electrons along the layer of electrochromic material becomes the rate controlling step for the movement of the colour change boundary 7 as mentioned in relation to process (c) above.

The electrode preferably comprises nickel although other electropositive material, such as iron, which have a tendency to dissolve in an acidic electrolyte (ie are electronegative with respect to hydrogen) may be used. The nature of the perishable commodity to which it is intended to apply the device may be a major factor governing choice of electrode material in view of the toxicity of some materials. The electrode is also preferably applied by screen printing and may be 60 to 100$\mu$ in thickness and cover a localized area of around 4 to 16 mm$^2$ of the strip of electrochromic material.

The electrolyte is preferably acidic and may comprise non-mineral acids such as formic acid, acetic acid, sulphuric and hydrochloric acid. Weaker acids, ie those having a higher pH, tend to be used with the more electropositive electrode materials in order to limit the dissolution rate. Acid concentrations may lie in the range 0.25M to 4M. It is also possible to use alkali electrolytes, for instance sodium hydroxide with a magnesium electrode. As mentioned above, the electrolyte may be a liquid or a gel. It is also possible to use a solid electrolyte such as phosphonomolybdic acid which has a high proton conductance.

The device is sealed from contact with the ambient atmosphere by being contained in a transparent polymer sheath 5 for example co-extruded ethylene vinyl alcohol polymer and a linear low-density polyethylene.

The device may, as mentioned above, comprise a layer of intermediate material 11 between the electrode and the layer of electrochromic material. The intermediate layer may have a predetermined or variable conductance and the transfer of electrons therethrough may be the rate determining step in the colouration process. The intermediate layer may, for example, be a thermistor which controls the injection of electrons into the layer of electrochromic material in dependence upon temperature or may be a photoconductor which controls the injection of electrons in dependence upon the intensity of light incident thereupon.

Details for one specific time temperature indicator device which has been constructed for use in the temperature range 1° C. to 11° C. will now be given. The device comprises a porous, paper susbstrate 140 $\mu$m thick with a strip of tungsten trioxide powder applied thereto by screen printing using an organic medium called Seristar SX (Trade Mark) produced by Sericol Ltd. The strip is formed with a thickness of between 10 and 30 $\mu$m and dried at room temperature or slightly elevated temperature, eg 50° C. The strip is about 30 mm long and 2 mm wide. An electrode 4 mm by 4 mm is formed on one end of the strip by screen printing nickel powder dispersed in a Seristar SX (Trade Mark) carrier to a thickness of 20 to 80 $\mu$m. The electrolyte used is 2M formic acid which is substantially absorbed by the porous substrate. The entire device is sealed in a transparent polymer sheath by ultrasonic sealing or infra-red sealing.

Activation of the device will be described as follows. It is desirable to be able to activate a device such as that described above at a given time, eg when it is applied to packaging of a commodity, and there are many ways of doing this. Three specific ways will be described by way of example.

Figure 4:
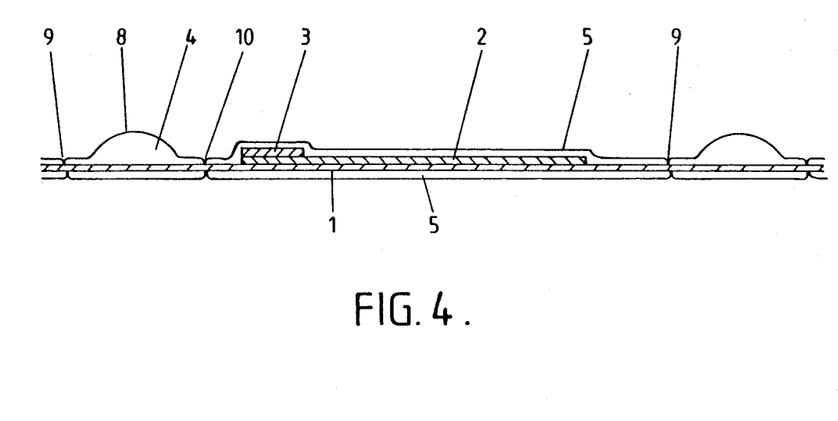
FIG. 4 is a cross-sectional view of a second embodiment of a time temperature device according to the invention illustrating a construction suitable for mass production.
Figure 5:
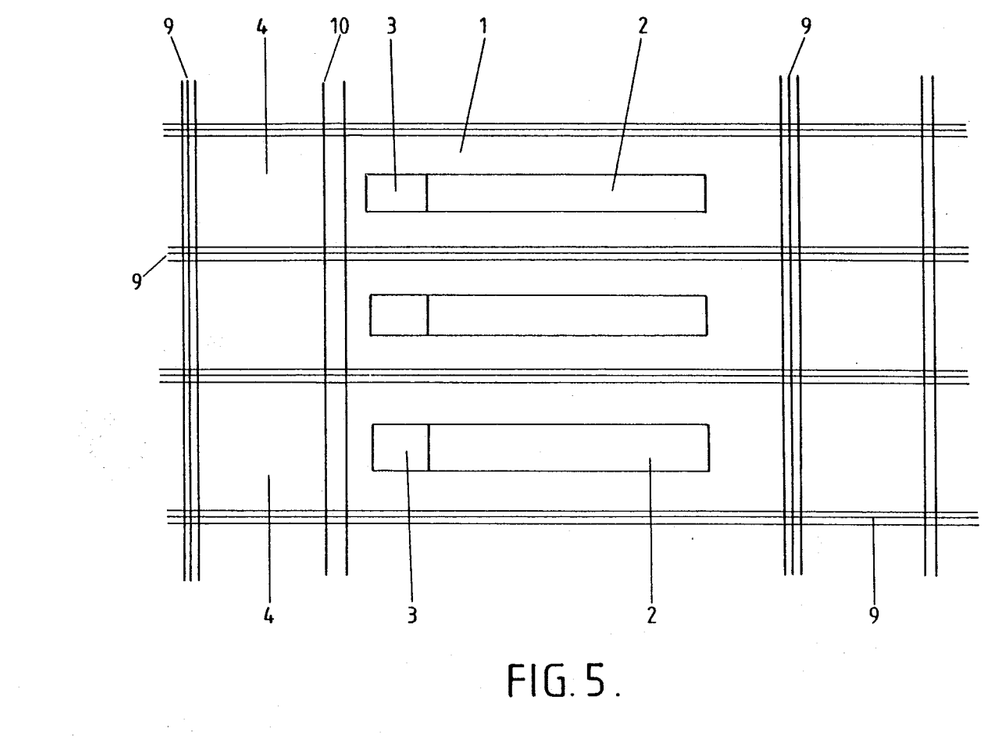
FIG. 5 is a plan view of the devices shown in FIG. 4.

(1) The electrolyte is initially kept separate from the electrode and the electrochromic material and only brought in contact therewith on activation of the device. This can be conveniently achieved by providing the electrolyte in a separate compartment, such as a blister pack 8, as shown in FIGS. 4 and 5. A rupturable seal is provided between the blister pack and the compartment containing the rest of the device so that on rupturing the seal, eg by passing the device between a pair of rollers, the electrolyte is brought into contact with the electrode and electrochromic material thereby activating the device.

(2) The electrode is initially isolated from the electrochromic material and only electrically connected thereto on activation of the device. This can be conveniently achieved by forming the electrode of a deformable material which is separated from the device but which is arranged so that when it is deformed, eg by passing the device between a pair of rollers, it is elongated or bent over so as to make contact with the electrochromic material thereby providing a localized area of communication therebetween and activating the device.

(3) The electrolyte is in contact with both the electrode and the electrochromic material but is frozen so as to prevent any dissolution of the electrode or diffusion of hydrogen ions occurring. The device is activated by simply allowing the electrolyte to thaw. This type of device is particularly suitable for monitoring whether a commodity such as ice cream has been subjected to temperatures above a certain threshold. If the melting point of the electrolyte corresponds to the threshold, the device will colour if the temperature rises above that threshold to indicate that the commodity is likely to be impaired.

FIGS. 4 and 5 illustrate a convenient construction for the mass production of devices. The devices are formed by placing a sheet of a highly porous paper substrate 1 onto a polymer sheet 5. Strips of electrochromic material 2, together with their associated electrodes 3, are then printed onto the substrate 1, for instance in rows of twenty with twenty rows per sheet. The electrolyte 4 is then deposited at appropriate positions onto the polymer sheet 5 and a further polymer sheet 5 is then laid over the top to cover each device and form blisterpacks 8 for the electrolyte 4. Seals 9 are formed through both polymer sheets 5 and the intervening porous paper substrate 1 to define individual devices and to provide a rupturable seal 10 in each device between the blisterpack 8 and the electrode 3 and strip of electrochromic material 2. An adhesive layer together with a removable cover sheet (not shown) may be applied to the underside of the first polymer sheet 5 to enable the device to be affixed easily to an article. The composite sheet thus formed is then cut into individual devices along the seals 9.

As mentioned above, time temperature indicator devices are suitable for use on perishable products such as food particularly as they can be produced inexpensively and are generally non-toxic. In the food industry, it is common to classify the storage capacity of perishable commodities by means of the "$Q_{10}$" factor, where $Q_{10}$ is defined as $$\frac{\text{rate of spoilage at } (T + 10)°C.}{\text{rate of spoilage at } T °C.}$$

It is assumed that perishable commodities are unlikely to be exposed to extremes of temperature; hence the temperature T° C. is not specified but the relationship is expected to hold over a temperature range for T of approximately 2° to 15° C., giving a maximum (T+10) figure of 25° C., that is, very warm room temperature. Perishable foodstuffs generally have a $Q_{10}$ factor in the range from about 1.1 to 10 with the range 2 to 5 covering most products. Therefore, for a product with a $Q_{10}$ factor of say 2.5, a time temperature indicator should be provided in which the colour change boundary moves at a rate such that $$\frac{\text{rate of movement at } (T + 10°)C.}{\text{rate of movement at } T °C.} = 2.5$$

within limits laid down by the food or other relevant industry.

Time temperature indicator devices can also be made to conform with other spoilage modules used in the food industry, eg. the Ratkowski formula.

A refined form of the device suitable for use in the food industry is provided with means to inhibit dissolution of the electrode in the early stages to allow for the initial incubation period for bacterial growth in a perishable product. This may, for instance, be achieved by coating the electrode with a suitable polymer which has to be broken down by the electrolyte before dissolution of the electrode can occur.

Whatever the application, it is of course necessary to design devices having predetermined characteristics. There are several factors which affect the rate of movement of the colour change boundary of a device and the sensitivity of the device to temperature changes. Amongst these are: the type of electrode used, the type and concentration of the electrolyte, the type of electrochromic material and the use of inert or vitreous filler material therein, and geometrical factors such as the width and thickness of the layer of electrochromic material. It is also necessary to control various process factors in order to maintain reproducibility of devices having predetermined characteristics and these include: the particle size of the electrochromic material, the type of organic carrier used in screen printing, the ratio of solids to organics in the screen printing formulation and the temperature at which the printed films are dried. By an appropriate selection of materials and processing conditions devices can thus be made having a predetermined temperature sensitivity and a predetermined rate of movement of the colour change boundary. In fact, depending on the materials chosen, a wide range of characteristics can be achieved, eg $Q_{10}$ factors in the range 1.5 to 4.5. It should also be remembered that as the dissolution rate is temperature sensitive care should be taken to ensure that the device has the required characteristics in the temperature range in which it is intended to be used.

It will be appreciated from the earlier discussion of the processed involved in determining the rate controlling step that devices in which the supply of electrons from the electrode to the layer of electrochromic material is the rate controlling step tend to show appreciable temperature sensitivity whereas those in which the rate controlling step is a diffusion process do not. It is therefore convenient to be able to carry out a simple test to determine which type of process is the rate controlling step in any particular device.

One simple test is to compare the distance moved by the colour change boundary in a normal device in which the electrode is positioned at the end of the strip of electrochromic material and another device in which the electrode is positioned in the middle of the strip, all other factors being held constant. In the latter arrangement, a colour change boundary will advance in each direction along the strip away from the electrode and in devices in which diffusion is the rate controlling step each colour change boundary will advance at approximately the same rate as in a normal device with the electrode positioned at the end of the strip so that after a given time approximately twice the length of strip is coloured as compared to a normal device.

In contrast, in devices in which the rate of dissolution of the electrode or the rate of transfer of electrons from the electrode to the layer of electrochromic material is the rate controlling step, the colour change boundaries on each side of the centrally positioned electrode advance at approximately half the normal rate so that after a given time approximately the same total length of strip is coloured as compared to a normal device with the electrode positioned at the end of the strip. This is because when the injection or transfer of electrons to the layer of electrochromic material is the rate controlling step, the supply of hydrogen ions attracted into the electrochromic material is limited to preserve space charge neutrality and these ions have to be shared between the two halves of the strip on either side of the centrally positioned electrode.

The results of tests as described above on devices comprising tungsten trioxide, a nickel electrode and an electrolyte of hydrochloric or formic acid are shown in Table 1. When a relatively concentrated acid was used, ie 2M hydrochloric acid or 0.1M formic acid, the dissolution rate of nickel at room temperature was high so the devices are diffusion controlled. When a relatively dilute acid, ie 0.025M formic acid, was used, the dissolution rate is limited and the device is dissolution controlled. Table 1 indicates the duration of each test, the total length of the coloured portion of the strip when the electrode was centrally positioned and the length when it was positioned on the end of the strip and the ratio of these lengths. It will be seen that for the devices which are believed to be substantially diffusion controlled, this ratio is about 1.85±0.09 whereas for devices which are believed to be substantially dissolution controlled the ratio is about 1.35±0.13. Figures of precisely 2.0 and 1.0, respectively, would not be expected since in practice one particular process does not have absolute control over the colouration rate.

Similar tests have been conducted on devices constructed in accordance with the disclosure of U.S. Pat. No. 3,940,205. A device was constructed in accordance with the disclosure relating to FIG. 1 of this prior art using a thin film layer of tungsten trioxide, an electrolyte of 1M sulphuric acid and an indium electrode. The total length of strip which coloured with a centre-printed electrode was almost double that which coloured when an end-printed electrode was used thus demonstrating that these devices are diffusion controlled. In addition, the colouration rate was very high, a 20 mm length of strip being coloured in less than 6 minutes in the end-printed test, that is a colouration rate of more than 200 mm/hour. A further test comparing the colouration rate at 6° C. and 22° C. showed virtually no difference in rates at these two temperatures so confirming that these prior art devices have negligible temperature sensitivity. This is not surprising since electrochromic devices have previously been used in applications such as display panels for electronic watches in which the temperature sensitivity of the colouration rate is an undesirable factor and the devices are designed to have very rapid colouration rates and to have as little sensitivity to temperature as possible.

The devices so far described have all operated as self-discharging internal cells requiring no external power source as electrons are injected into the electrochromic material as the electrode dissolves. It is also possible to inject electrons from some other source, eg by using a photodiode as the electrode in place of or in conjunction with a dissolving metal electrode. In many applications the ability to function without an external power source is an advantage but in some cases it may be desirable to apply an external current source to the device as a further means of controlling the supply of electrons between the electrode and the colour change boundary. The external current source can be used to increase or decrease the supply of electrons and can itself be made dependent on a parameter monitored by an appropriate transducer. The colouration rate of the layer of electrochromic material can thus be made dependent on parameters other than time and temperature so the device can be used as a coulomb meter in a wide variety of applications. For instance, a current input to the device may be arranged to vary in dependence upon the output of a pressure transducer so that the position of the colour change boundary provides a visual indication of the pressure-time integral. This may be done by connecting the output voltage of the pressure transducer across two gold electrodes deposited on the device, one electrode being connected to the layer of electrochromic material and the other being in contact with the electrolyte. Two or more transducers may also be used either in series or parallel with each other depending on the quantity to be monitored and, again, may be used in place of or in conjunction with a source of injected electrons such as a dissolving electrode.

TABLE 1

| ACID | TIME (min) | TOTAL BRONZE LENGTHS* | | COLOURATION RATE (CENTRE)/ COLOURATION RATE (END) |
|---|---|---|---|---|
| | | CENTRE PRINTS (mm) | END PRINTS (mm) | |
| 2 M HCl | 7 | 22 | 12 | 1.83 |
| 0.1 M FORMIC | 12 | 5.45 | 3.1 | 1.76 |
| 0.1 M FORMIC | 30 | 10.6 | 5.7 | 1.86 |
| 0.1 M FORMIC | 70 | 17.6 | 9.5 | 1.85 |
| 0.025 FORMIC | 20 | 2.18 | 1.55 | 1.41 |
| 0.025 FORMIC | 140 | 8.46 | 6.25 | 1.35 |
| 0.025 FORMIC | 270 | 11.04 | 9.07 | 1.22 |

*excluding bronze formed under electrode.

We claim:

1. An indicator device for indicating a time integral of a monitored parameter, comprising:
   a substrate;
   a layer of electrochromic material carried on said substrate;
   a single electrode;
   an electrolyte for contacting at least: (a) the layer of electrochromic material and (b) the electrode;
   means for activating said device by selectively contacting said electrolyte to said electrode and said layer to cause electrons to pass from the electrode to the layer of electrochromic material by a localized area of communication therebetween causing an electromagnetic absorption characteristic, and hence color, of the electrochromic material to change so that a color change boundary advances across the layer of electrochromic material away from said area of communication,
   said electrochromic material, electrode and electrolyte being chosen and arranged such that the rate of advancement of the color change boundary is substantially determined by a supply of electrons from the electrode to an unchanged electrochromic material at the color change boundary, said supply of electrons being responsive to changes in the monitored parameter, whereby the position of the color change boundary provides a visual indication of the time integral of the monitored parameter since activation of the device.

2. A device as claimed in claim 1 in which the monitored parameter is temperature, the said supply of electrons being temperature sensitive whereby the position of the colour change boundary provides a visual indication of the cumulative time-temperature history of the device since activation.

3. A device as claimed in claim 1 in which the electrode is of a material which dissolves in the electrolyte so as to inject electrons into the layer of electrochromic material without the need to apply an external power source to the device.

4. A device as claimed in claim 1, 2 or 3 further including an intermediate material disposed between said electrode and said layer, and wherein the said supply of electrons is determined by the rate of transfer of electrons through said intermediate material from the electrode to the layer of electrochromic material.

5. A device as claimed in claim 4 in which the intermediate material comprises a thermistor.

6. A device as claimed in claim 2 in which the rate of advancement of the colour change boundary increases 1.5 to 4.5 times for a 10° C. temperature rise.

7. A device as claimed in claim 6 in which the rate of advancement of the colour change boundary is in the range 0.09–0.22 mm/hour.

8. A device as claimed in claim 2 in combination with a perishable commodity and arranged so as to provide a visual indication of the time-temperature history of the commodity since activation of the device.

9. A device as claimed in claim 8 arranged so as to provide a visual indication of the remaining shelf-life of the commodity.

10. A device as claimed in claim 3 in which the said supply of electrons is determined by the rate of dissolution of the electrode in the electrolyte.

11. A device as claimed in claim 3 in which the electrode comprises nickel or iron.

12. A device as claimed in claim 1 in which the said supply of the electrons is determined by the rate of transfer of electrons along the layer of electrochromic material from the said localized area of communication to the colour change boundary.

13. A device as claimed in claim 1 in which the said supply of electrons is determined by the rate of transfer of electrons across the colour change boundary.

14. A device as claimed in claim 1 in which the layer of electrochromic material has a thickness in the range 10 to 30 μm.

15. A device as claimed in claim 1 in which the layer of electrochromic material is in the form of a strip arranged so that the colour change boundary advances along the length of the strip.

16. A device as claimed in claim 1 in which the electrochromic material comprises tungsten trioxide ($WO_3$).

17. A device as claimed in any claim 1 in which the electrolyte is in contact with the electrode and the layer of electrochromic material but is frozen so as to prevent electrode dissolution until activation of the device.

18. A device as claimed in claim 1 in which the electrode is isolated from the layer of electrochromic material until activation of the device.

19. A device as claimed in claim 18 in which the electrode is deformable and arranged so that deformation of the device during activation deforms the electrode to electrically connect it to the layer of electrochromic material.

20. A device as claimed in claim 1 in which the electrolyte is separated from the electrode and the layer of electrochromic material until activation of the device.

21. A device as claimed in claim 20 in which the electrolyte is contained within a blister pack which is ruptured upon activation to allow the electrolyte to contact the electrode and the layer of electrochromic material.

22. An electrochromic indicator device for indicating a time integral of a monitored parameter, the device comprising:

a substrate carrying a layer of electrochromic material;

a single electrode; and an electrolyte in contact with at least the layer of electrochromic material and the electrode, the arrangement being such that the monitored parameter causes a passage of electrons from the electrode to the layer of electrochromic material which causes an electromagnetic absorption characteristic, and hence color, of the electrochromic material to change so that a color change boundary advances along the layer of electrochromic material to provide a visual indication of the time integral of the monitored parameter since activation of the device by selectively providing contact of said electrolyte, said electrode and said substrate.

23. The use as claimed in claim 22 in which the monitored parameter is temperature, the said passage of electrons being temperature sensitive whereby the position of the colour change boundary provides a visual indication of the cumulative time-temperature history of the device since activation.

* * * * *